US010669767B2

(12) United States Patent
Nihei et al.

(10) Patent No.: US 10,669,767 B2
(45) Date of Patent: Jun. 2, 2020

(54) MOTION DETERMINATION DEVICE AND MOTION DETERMINATION METHOD

(71) Applicant: KABUSHIKI KAISHA HONDA LOCK, Miyazaki-shi, Miyazaki (JP)

(72) Inventors: Naoki Nihei, Miyazaki (JP); Tomonori Kamimura, Miyazaki (JP)

(73) Assignee: KABUSHIKI KAISHA HONDA LOCK, Miyazaki (JP)

( * ) Notice: Subject to any disclaimer, the term of this patent is extended or adjusted under 35 U.S.C. 154(b) by 0 days.

(21) Appl. No.: 16/318,648

(22) PCT Filed: Jul. 12, 2017

(86) PCT No.: PCT/JP2017/025363
§ 371 (c)(1),
(2) Date: Jan. 17, 2019

(87) PCT Pub. No.: WO2018/051625
PCT Pub. Date: Mar. 22, 2018

(65) Prior Publication Data
US 2019/0242176 A1    Aug. 8, 2019

(30) Foreign Application Priority Data

Sep. 13, 2016   (JP) .................................. 2016-178686

(51) Int. Cl.
*E05F 15/73*       (2015.01)
*G01B 7/00*        (2006.01)
(Continued)

(52) U.S. Cl.
CPC ................. *E05F 15/73* (2015.01); *B60J 5/10* (2013.01); *B60R 25/2054* (2013.01);
(Continued)

(58) Field of Classification Search
CPC ....................................................... E05F 15/73
(Continued)

(56) References Cited

U.S. PATENT DOCUMENTS

2011/0276234 A1    11/2011  Van Gastel
2013/0234828 A1*    9/2013  Holzberg ............ B60R 25/2054
                                                340/5.72
(Continued)

FOREIGN PATENT DOCUMENTS

CN          102271975 A      12/2011
CN          104181823 A      12/2014
(Continued)

OTHER PUBLICATIONS

International Search Report dated Aug. 29, 2017 filed in PCT/JP2017/025363.
(Continued)

*Primary Examiner* — Qutbuddin Ghulamali
(74) *Attorney, Agent, or Firm* — Rankin, Hill & Clark LLP

(57) ABSTRACT

Provided are a motion determination device and a method capable of correctly determining a kicking motion by a user about to open or close a gate of a vehicle. The motion determination device includes sensors respectively mounted on positions spaced apart from each other and detecting approach of an object, and a determination device which determines that the predetermined kicking motion has been performed, when each detection value shows a predetermined pattern, a time until each of the detection values becomes less than a first threshold value after it becomes the first threshold value or more is within a predetermined time, and a ratio of a maximum value among detection values by a first sensor and a maximum value among the detection
(Continued)

values by a second sensor different from the first sensor is within a predetermined range.

7 Claims, 5 Drawing Sheets

(51) Int. Cl.
*E05B 49/00* (2006.01)
*E05F 15/79* (2015.01)
*E05B 81/78* (2014.01)
*B60J 5/10* (2006.01)
*B60R 25/20* (2013.01)
*G06T 7/20* (2017.01)

(52) U.S. Cl.
CPC .............. *E05B 49/00* (2013.01); *E05B 81/78* (2013.01); *E05F 15/79* (2015.01); *G01B 7/00* (2013.01); *G06T 7/20* (2013.01); *E05Y 2400/858* (2013.01); *E05Y 2900/532* (2013.01); *E05Y 2900/546* (2013.01); *G06T 2207/30248* (2013.01)

(58) Field of Classification Search
USPC .................................................. 340/5.7–5.74
See application file for complete search history.

(56) References Cited

U.S. PATENT DOCUMENTS

| | | |
|---|---|---|
| 2014/0195073 A1 | 7/2014 | Herthan |
| 2015/0019046 A1 | 1/2015 | Jang et al. |
| 2015/0025751 A1* | 1/2015 | Sugiura .................... B60J 5/06 701/49 |
| 2016/0265263 A1* | 9/2016 | Motoki ................... E05F 15/73 |
| 2017/0152697 A1* | 6/2017 | Dehelean ............ B60R 25/2054 |

FOREIGN PATENT DOCUMENTS

| | | |
|---|---|---|
| CN | 204028591 U | 12/2014 |
| CN | 104281937 A | 1/2015 |
| CN | 104612530 A | 5/2015 |
| JP | 2015021238 A | 2/2015 |
| JP | 201598298 A | 5/2015 |
| JP | 5829690 B2 | 12/2015 |
| WO | 2010076332 A1 | 7/2010 |
| WO | 2015155186 A1 | 10/2015 |

OTHER PUBLICATIONS

Chinese Office Action(CNOA) dated Feb. 6, 2020 for the corresponding Chinese Patent Application No. 201780043760.2 and its English translation.

* cited by examiner

FIG. 1
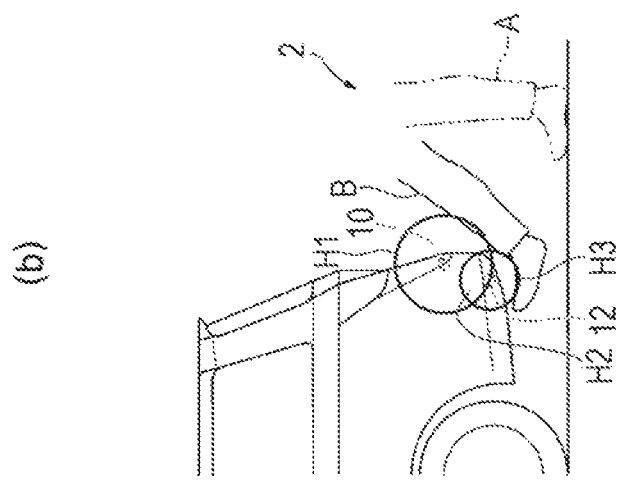
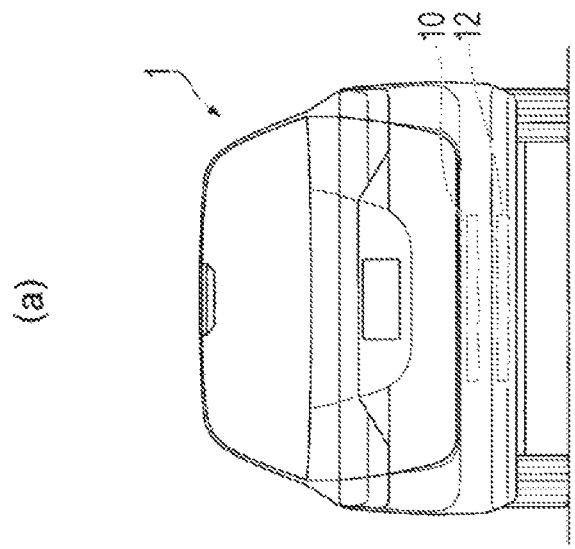
FIG. 2
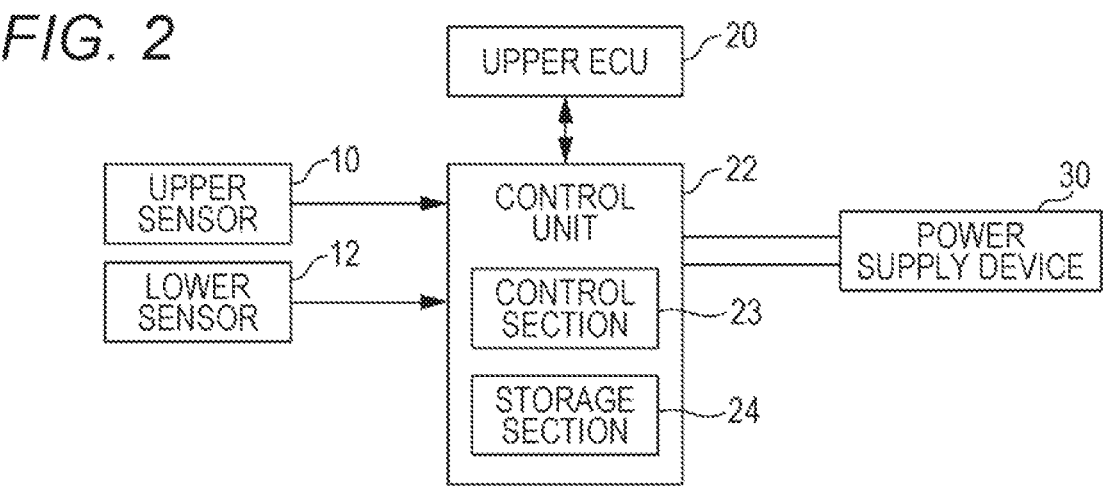

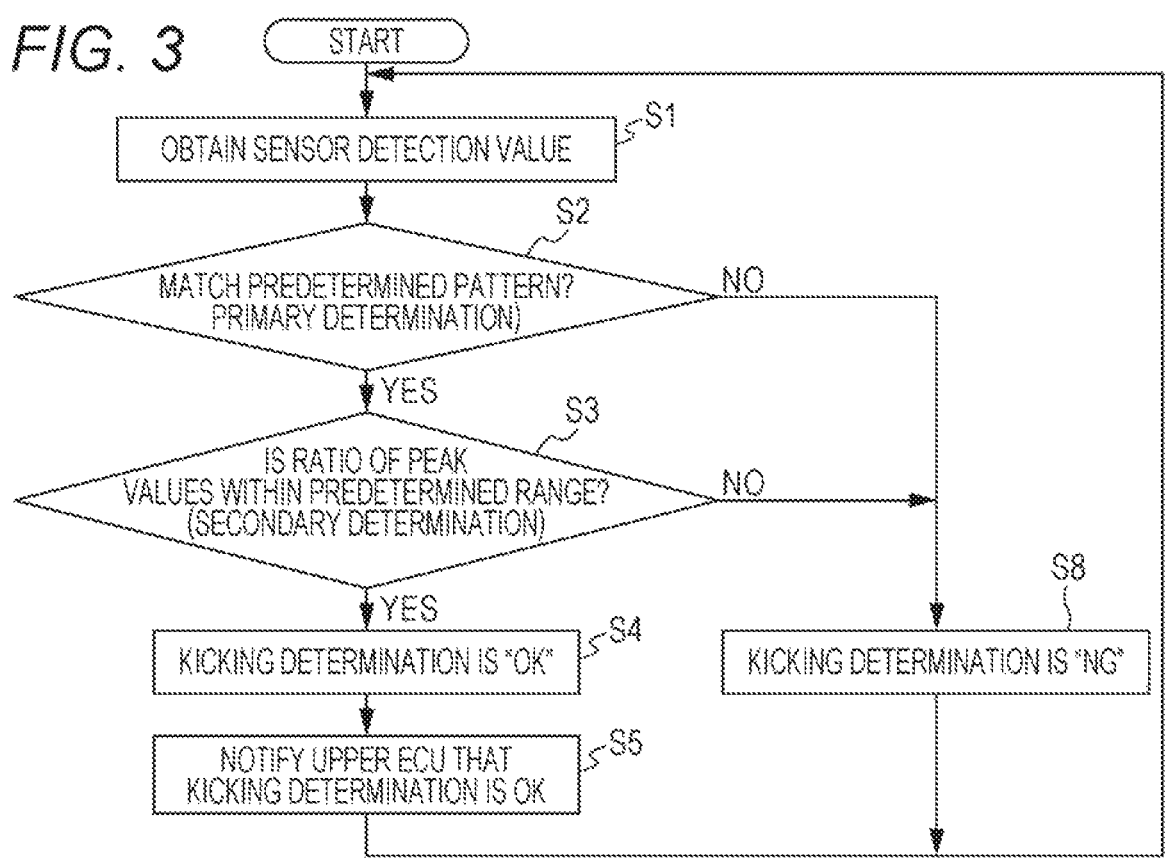
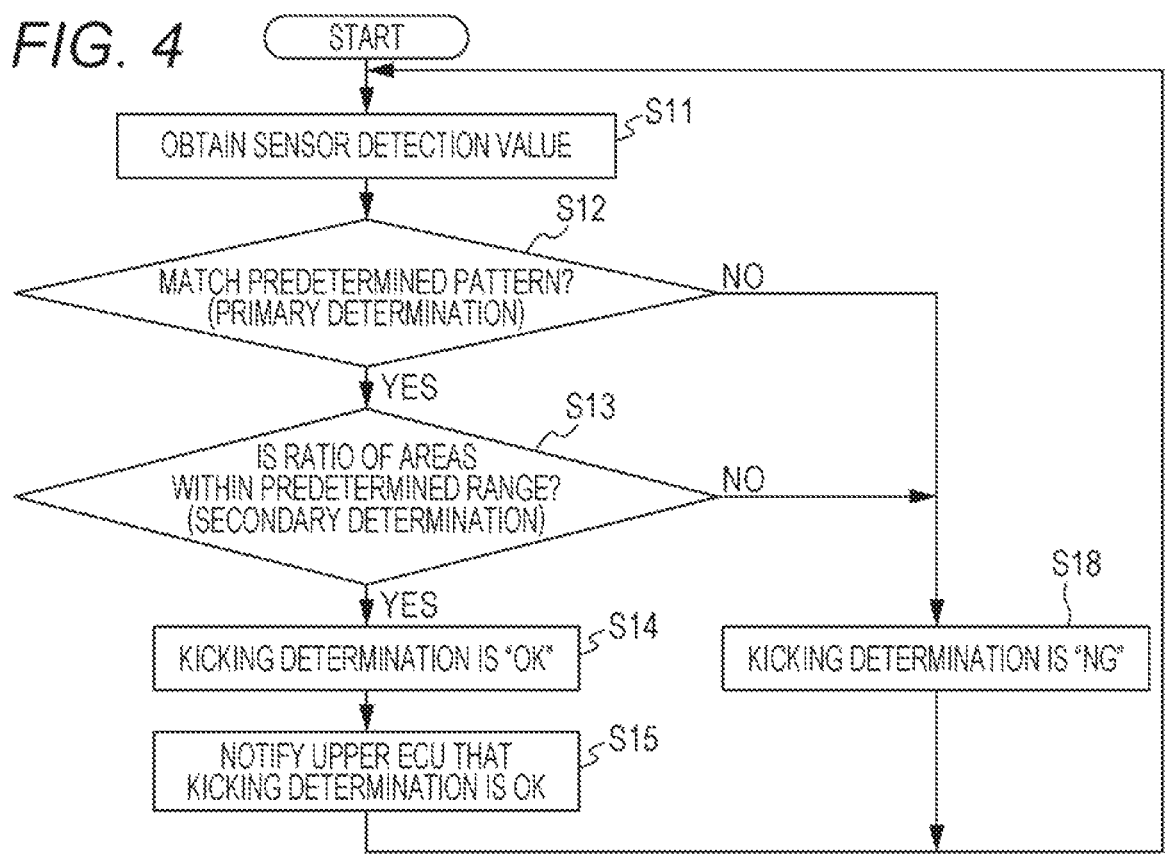

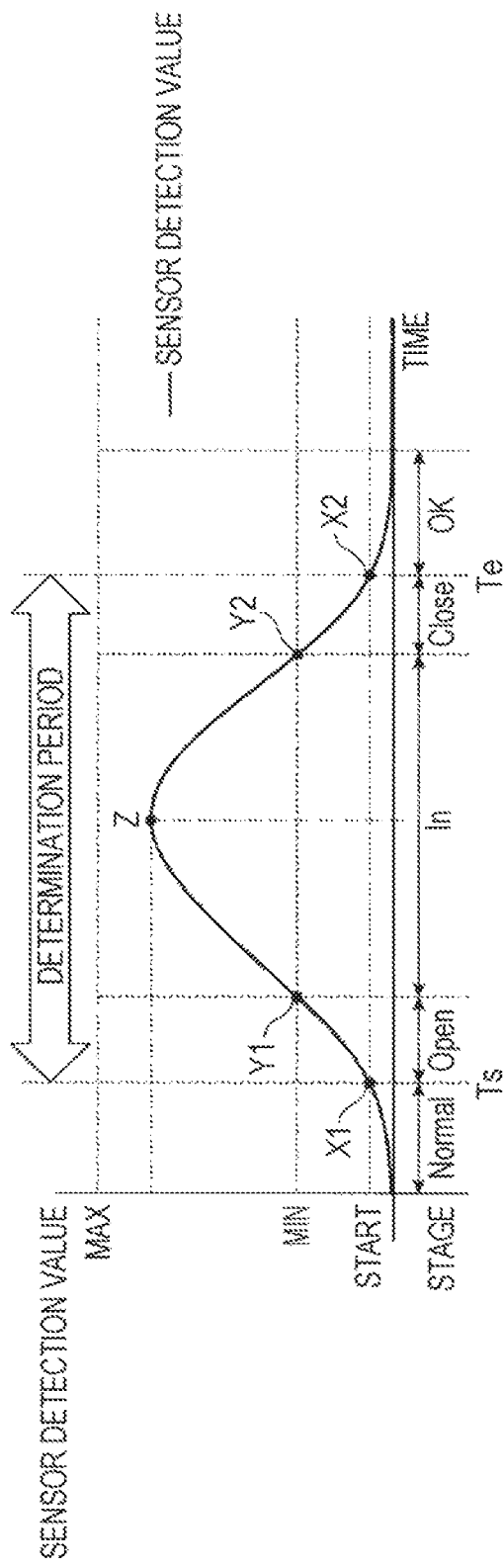

FIG. 6
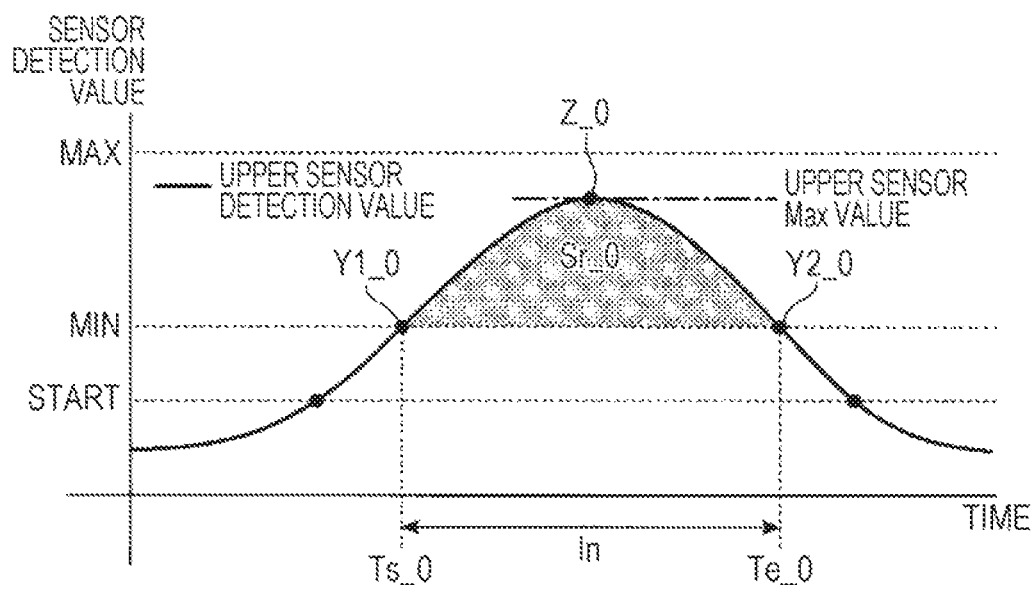
(a)
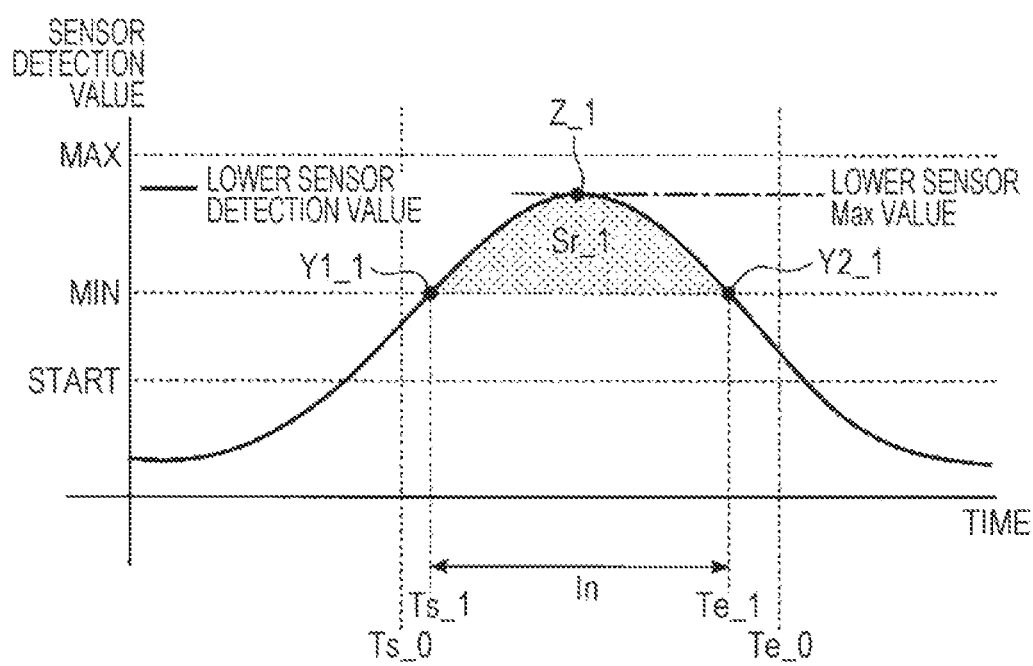
(b)

FIG. 7
(a) Kick
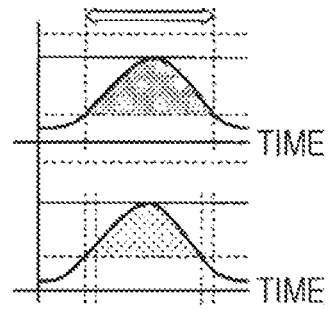
(b) Walking
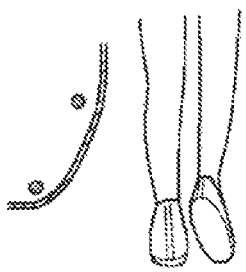
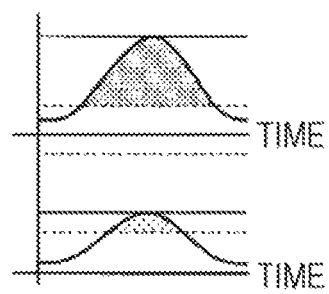
(c) Animal
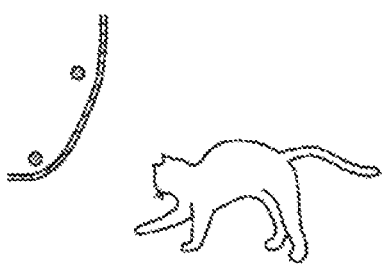
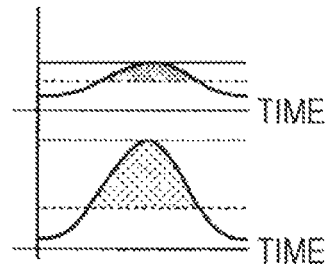
(d) Hose
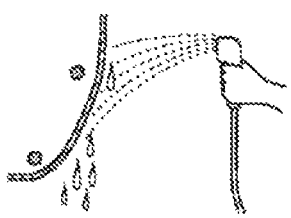
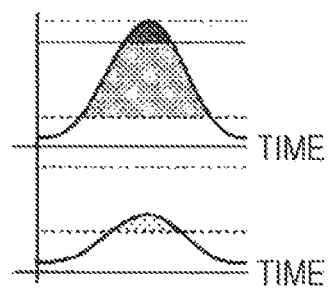
(e) Rain
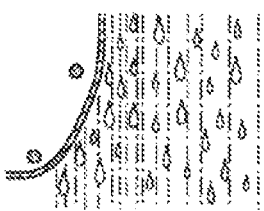
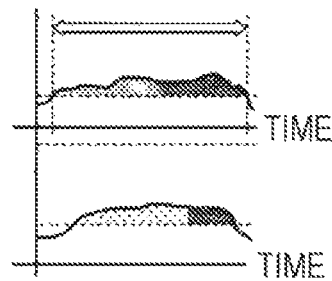

MOTION DETERMINATION DEVICE AND MOTION DETERMINATION METHOD

TECHNICAL FIELD

This application claims priority based on Japanese Patent Application No. 2016-178686 filed on Sep. 13, 2016 and incorporates its contents by reference.

The present invention relates to a motion determination device and a motion determination method.

BACKGROUND ART

A technology has been disclosed in which releasing locking of an opening/closing body, and an opening operation of the opening/closing body are automatically performed by a driver (user) having an electronic key performing a kicking motion in a vicinity of the opening/closing body when the driver is about to open or close the opening/closing body such as a trunk, a rear gate, a hinged door, and a sliding door of a vehicle (for example, PATENT LITERATURE 1 and PATENT LITERATURE 2).

According to the device described in PATENT LITERATURE 1, electrostatic sensors for detecting approach of the user are provided at two different places around the trunk. Then, after an upper sensor detects approach of a portion near the user's knee, when a lower sensor detects approach of a distal portion from the user's ankle, it is determined that the kicking motion has been performed. Then, the rear gate opens.

In the device described in PATENT LITERATURE 2, one upper electrostatic sensor and a plurality of lower electrostatic sensors are provided. Then, when two or more of the plurality of lower sensors detect the approach at the same time, the rear gate is controlled not to open. In this way, an erroneous operation is prevented.

CITATION LIST

Patent Literature

PATENT LITERATURE 1: WO 2010/076332
PATENT LITERATURE 2: JP-A-2015-021238

SUMMARY OF THE INVENTION

Problems to be Solved by the Invention

However, in the typical technology, there is a problem that the approach of a person or a small animal passing near the vehicle may be erroneously determined as the kicking motion in some cases. In addition, there is a problem that the number of parts may be increased in some cases to try to prevent an erroneous determination.

The present invention has been made in view of such circumstances. An object of the present invention is to provide a motion determination device and a motion determination method capable of correctly determining the kicking motion performed by the user intending to open or close the rear gate or the like of the vehicle.

Solution to the Problems

In a motion determination device according to the present invention, the following structures are employed.

(1) Two or more sensors (10, 12) respectively mounted on positions which are spaced apart from each other and have a relative vertical relationship in a vehicle, and detecting approach of an object; and a determination device (22) for determining whether a predetermined kicking motion has been performed based on detection values by the two or more sensors are provided, wherein the determination device determines that the predetermined kicking motion has been performed when each of the detection values shows a pattern in which the detection value becomes equal to or more than a first threshold value and then equal to or more than a second threshold value greater than the first threshold value, and thereafter becomes less than the second threshold value and then less than the first threshold value, a time until each of the detection values becomes less than the first threshold value after it becomes equal to or more than the first threshold value is within a predetermined time, and a ratio of a maximum value of a first sensor among the two or more sensors and a maximum value of a second sensor different from the first sensor among the two or more sensors is within a predetermined range.

According to such a structure, the determination device determines that the kicking motion has been performed when each of the detection values by the two or more sensors changes under the pattern and the condition described below. In this pattern, the detection value becomes equal to or more than the first threshold value and then becomes equal to or more than the second threshold value greater than the first threshold value. Thereafter, the detection value becomes less than the second threshold value and then becomes less than the first threshold value. In this pattern, when the time until the detection value becomes less than the first threshold value after it becomes equal to or more than the first threshold value is within the predetermined time, and further, the ratio of the maximum value of the first sensor among the two or more sensors and the maximum value of the second sensor different from the first sensor among the two or more sensors is within the predetermined range, it is determined that the kicking motion has been performed. As a result, the motion determination device can correctly determine the kicking motion intended and performed by the user.

Furthermore, in a motion determination device according to the present invention, the following structures are employed.

(2) Two or more sensors respectively mounted on positions which are spaced apart from each other and have a relative vertical relationship in a vehicle, and detecting approach of an object; and a determination device for determining whether a predetermined kicking motion has been performed based on detection values by the two or more sensors are provided, wherein the determination device determines that the predetermined kicking motion has been performed when each of the detection values shows a pattern in which the detection value becomes equal to or more than a first threshold value and then equal to or more than a second threshold value greater than the first threshold value, and thereafter becomes less than the second threshold value and then less than the first threshold value, a time until each of the detection values becomes less than the first threshold value after it becomes equal to or more than the first threshold value is within a predetermined time, and a ratio of a first integrated value, which is an integrated value obtained by integrating portions exceeding the second threshold value out of the detection values by a first sensor out of the two or more sensors within a time period after the detection values by the first sensor becomes equal to or more than the second threshold value until it becomes less than the second threshold value, and a second integrated value, which is an integrated value obtained by integrating portions exceeding the second threshold value out of the detection values by a second sensor different from the first sensor among the two or more sensors within a time period after the detection values by the second sensor becomes equal to or more than the second threshold value until it becomes less than the second threshold value, is within a predetermined range.

According to such a structure, the determination device determines that the kicking motion has been performed when each of the detection values by the two or more sensors changes under the pattern and the condition described below. In this pattern, the detection value becomes equal to or more than the first threshold value and then becomes equal to or more than the second threshold value greater than the first threshold value. Thereafter, the detection value becomes less than the second threshold and then becomes less than the first threshold value. In this pattern, when the time until the detection value becomes less than the first threshold value after it becomes equal to or more than the first threshold value is within the predetermined time, and further, the ratio of the integrated value obtained by integrating portions exceeding the second threshold value out of the detection values by the first sensor out of the two or more sensors within the time period after the detection values by the first sensor becomes equal to or more than the second threshold value until it becomes less than the second threshold value, and the integrated value obtained by integrating portions exceeding the second threshold value out of the detection values by the second sensor different from the first sensor among the two or more sensors within the time period after the detection values by the second sensor becomes equal to or more than the second threshold value until it becomes less than the second threshold value, is within the predetermined range, it is determined that the kicking motion has been performed. As a result, the motion determination device can correctly determine the kicking motion intended and performed by the user.

(3) In the motion determination device according to the above (1) or (2), the determination device may determine that the predetermined kicking motion has been performed when the maximum value of each of the detection values is a value not exceeding a third threshold value more than the second threshold value.

According to such a structure, the motion determination device can correctly determine the kicking motion intended and performed by the user as in the above structure. Further, the motion determination device determines that the predetermined kicking motion has been performed when the detection value by the sensor does not exceed the third threshold value which is more than the second threshold value. Then, the motion determination device determines whether the object approaches within a range of the approach assumed by the kicking motion. Thus, the kicking motion intended and performed by the user can be correctly determined.

(4) In the motion determination device according to any one of the above (1) to (3), the determination device may determine that the predetermined kicking motion has been performed when the detection value by the second sensor becomes equal to or more than the first threshold value and then becomes less than the first threshold value within a period in which the detection value by the first sensor becomes equal to or more than the first threshold value and then becomes less than the first threshold value.

According to such a structure, the motion determination device can correctly determine the kicking motion intended and performed by the user as in the above structure. Further, the motion determination device determines that the predetermined kicking motion has been performed when the detection value by the second sensor becomes equal to or more than the first threshold value and then becomes less than the first threshold value within a period in which the detection value by the first sensor becomes equal to or more than the first threshold value and then becomes less than the first threshold value. Thus, the motion determination device can correctly determine the kicking motion intended and performed by the user.

Furthermore, in a motion determination method of the present invention, the following structure is employed.

(5) A detection step in which two or more sensors respectively mounted on positions which are spaced apart from each other and have a relative vertical relationship in a vehicle detect approach of an object; and a determination step of determining whether a predetermined kicking motion has been performed based on detection values by the two or more sensors are provided, wherein in the determination step, it is determined that the predetermined kicking motion has been performed when each of the detection values shows a pattern in which the detection value becomes equal to or more than a first threshold value and then equal to or more than a second threshold value greater than the first threshold value, and thereafter becomes less than the second threshold value and then less than the first threshold value, a time until each of the detection values becomes less than the first threshold value after it becomes equal to or more than the first threshold value is within a predetermined time, and a ratio of a maximum value by a first sensor among the two or more sensors and a maximum value by a second sensor different from the first sensor among the two or more sensors is within a predetermined range.

According to such a structure, the determination step determines that the kicking motion has been performed when each of the detection values by the two or more sensors changes under the pattern and the condition described below. In this pattern, the detection value becomes equal to or more than the first threshold value and then becomes equal to or more than the second threshold value greater than the first threshold value. Thereafter, the detection value becomes less than the second threshold value and then becomes less than the first threshold value. In this pattern, when the time until a maximum value of the detection value becomes less than the first threshold value after it becomes equal to or more than the first threshold value is within the predetermined time, and further, the ratio of the maximum value of the first sensor among the two or more sensors and the maximum value of the second sensor different from the first sensor among the two or more sensors is within the predetermined range, it is determined that the kicking motion has been performed. As a result, the motion determination method can correctly determine the kicking motion intended and performed by the user.

Effects of the Invention

As described above, according to the present invention, it is possible to correctly determine the kicking motion performed by the user who is about to open or close the rear gate or the like of the vehicle.

BRIEF DESCRIPTION OF THE DRAWINGS

FIGS. 1(a) and 1(b) are schematic views showing a state in which a motion determination device according to an embodiment of the present invention is provided in a vehicle.

FIG. 2 is a block diagram showing a configuration of the motion determination device in FIGS. 1(a) and 1(b).

FIG. 3 is a flowchart showing an example of a process performed in determination of a kicking motion.

FIG. 4 is a flowchart showing an example of a process performed in the determination of the kicking motion and different from that in FIG. 3.

FIG. 5 is a diagram for explaining a primary determination.

FIGS. 6(a) and 6(b) are diagrams for explaining a secondary determination.

FIGS. 7(a) to 7(e) are diagrams for explaining the determination in the case where an object performing the kicking motion and other motions approaches a sensor.

DESCRIPTION OF THE EMBODIMENTS

A motion determination device and a motion determination method according to an embodiment of the present invention will be described below with reference to the drawings.

FIGS. 1(a) and 1(b) are schematic views showing a state in which the motion determination device according to the embodiment of the present invention is provided in a vehicle. FIG. 1(a) shows a view of a state in which the motion determination device according to the embodiment of the present invention is provided in the vehicle as seen from a front of a rear portion of the vehicle. FIG. 1(b) shows a view of the rear portion of the vehicle as seen from a side.

The motion determination device shown in FIGS. 1(a) and 1(b) determines whether a predetermined kicking motion has been performed based on detection values output from two sensors mounted around an opening/closing body such as a rear gate of a vehicle 1. Since the motion determination device determines that the kicking motion has been performed, a user 2 can unlock the opening/closing body without using a mechanical key and without separately operating an electronic key if the user 2 has the electronic key. The predetermined kicking motion will be described below in detail.

An upper sensor 10 and a lower sensor 12 are respectively mounted on positions which are spaced apart from each other and have a relative vertical relationship in the vehicle. In an example shown in FIGS. 1(a) and 1(b), the upper sensor 10 is mounted on a front surface of the rear portion of the vehicle over a rear bumper in the rear portion of the vehicle 1. The lower sensor 12 is mounted on a bottom surface of the rear portion of the vehicle under the rear bumper.

Both sensors of the upper sensor 10 and the lower sensor 12 only have to be arranged to have a relative vertical positional relationship. That is, the both sensors may be arranged to have the relative vertical relationship in a bumper on a side of the vehicle. Or, the both sensors may be arranged to have the relative vertical relationship in the rear bumper of the rear portion of the vehicle.

The upper sensor 10 and the lower sensor 12 are arranged depending on a shape of the rear bumper when arranged in the rear bumper. For example, in the case where the rear bumper is formed in a curved surface shape inclined obliquely downward or obliquely upward as seen from the side of the vehicle, the upper sensor 10 and the lower sensor 12 can be arranged in the rear bumper along the curved surface.

The upper sensor 10 and the lower sensor 12 detect approach of an object. The upper sensor 10 and the lower sensor 12 are, for example, electrostatic capacitance sensors having electrodes for detecting electrostatic capacitance. In this case, the upper sensor 10 and the lower sensor 12 output a change in the electrostatic capacitance between the sensor electrode and the object in the vicinity. In this way, the upper sensor 10 and the lower sensor 12 can output the detection values corresponding to distances to the object approaching the respective sensors.

The electrode for detecting the electrostatic capacitance is constituted by a coaxial cable or a metal plate. When the coaxial cable constitutes the electrode, the cost can be reduced as compared with a case where the electrode is constituted by the metal plate.

As shown in FIG. 1, a sensor detection region in which the upper sensor 10 detects the approach of the object is a region H1 centering on the upper sensor 10. A sensor detection region in which the lower sensor 12 detects the approach of the object is a region H3 around the lower sensor 12. The regions H1 and H3 may have an overlapping region H2. Alternatively, the regions H1 and H3 may not have the overlapping region. The motion determination device of the present embodiment can determine the kicking motion based on the detection values from the respective sensors even when the sensor detection regions of the sensors have the overlapping region. Therefore, it is not necessary to provide a shield for distinguishing the respective sensor detection regions. Therefore, the cost can be reduced.

When the user 2 is about to open the rear gate of the vehicle 1, the user 2 having the electronic key performs the kicking motion around the rear gate, for example, near a center of the rear portion of the vehicle. Here, the kicking motion is, for example, a motion in which a state of a leg of the user 2 has changed from A to B and then returns to the state of A.

When the user 2 performs the kicking motion, the upper sensor 10 and the lower sensor 12 output the detection values corresponding to the approach of the object depending on the motion from A to B. Further, the upper sensor 10 and the lower sensor 12 output the detection values corresponding to separation of the object by the motion from B to A.

The motion determination device recognizes the approach and separation of the object based on the detection values by the upper sensor 10 and the lower sensor 12. In this case, the motion determination device determines that the kicking motion has been performed when its mode is a mode assumed to be the kicking motion.

Here, a processing block used for performing a determination process by the motion determination device according to the embodiment of the present invention will be described with reference to FIG. 2. FIG. 2 is a block diagram of the motion determination device according to the embodiment of the present invention.

As shown in FIG. 2, the motion determination device includes the upper sensor 10, the lower sensor 12 and a control unit 22. Further, the control unit 22 includes a control device 23 and a storage 24.

The motion determination device receives supply of power from a power supply device 30 and makes a motion determination. When the motion determination device determines that the kicking motion has been performed as a result of the motion determination, the motion determination device notifies an upper ECU (Electronic Control Unit) 20 of the determination.

Each of the upper sensor 10 and the lower sensor 12 has the sensor electrode and output a change in electrostatic capacitance between the sensor electrode and the object approaching the sensor electrode.

The upper sensor 10 is provided, for example, on an upper surface of the rear bumper of the vehicle 1 and detects the approach of the object within the detection region. The lower sensor 12 is provided, for example, on a lower surface of the rear bumper of the vehicle 1 and detects the approach of the object from a substantially horizontal direction as in the upper sensor 10.

That is, the upper sensor 10 can detect the approach of the leg below a knee of the user 2 at the same height as a position of its own sensor electrode. In addition, the lower sensor 12 can detect the approach of a foot ahead of an ankle of the user 2 at the same height as the position of its own sensor electrode.

Further, the upper sensor 10 and the lower sensor 12 output the detection values to the control device 23.

The upper ECU 20 is connected to the control unit 22. The upper ECU 20 controls locking/unlocking and opening/closing operations of the opening/closing body such as the rear gate of the vehicle 1 based on a notification from the control unit 22.

When the upper ECU 20 is notified from the control unit 22 that it is determined that the kicking motion has been performed (kicking determination OK), the upper ECU 20 performs authentication of the electronic key. When the authentication of the electronic key is successful, the upper ECU 20 transmits an unlock command signal and the like to an opening/closing controller, which is not shown in the figures, of the opening/closing body of the vehicle 1, and controls the locking/unlocking and opening/closing operation of the opening/closing body.

Or, the upper ECU 20 performs the authentication of the electronic key. When the upper ECU 20 receives the notification of the kicking determination OK from the control unit 22 in a state where the authentication of the electronic key is successful, the upper ECU 20 controls the operation such as locking of the opening/closing body. The authentication of the electronic key here means confirming that the electronic key is an authorized electronic key of the vehicle 1.

The control unit 22 is connected to the upper ECU 20 and notifies of the kicking determination OK.

The control unit 22 includes the control device 23 and the storage 24 and determines whether the kicking motion has been performed by using the control device 23 and the storage 24.

The control device 23 is connected to the upper sensor 10 and the lower sensor 12 and obtains sensor detection values from the both sensors. The control device 23 determines whether the kicking motion has been performed based on the obtained sensor detection values. The control device 23 continuously obtains the detection values in order to make such a determination. Details of a process for determining whether the kicking motion has been performed will be described below.

Further, the control device 23 is connected to the storage 24, reads parameters such as threshold values necessary for the determination from the storage 24, and further writes the detection values, the parameters and the like used in a process of the determination in the storage 24.

The power supply device 30 is, for example, a battery of the vehicle 1. The power supply device 30 supplies power to a control circuit and the like of the control unit 22.

Hereinafter, the process for determining whether the kicking motion has been performed will be described.

FIG. 3 is a flowchart showing an example of a process performed in the determination of the kicking motion. FIG. 4 is a flowchart showing an example of a process different from that in FIG. 3 among processes performed in the determination of the kicking motion.

The control device 23 makes a primary determination and a secondary determination in order to determine the kicking motion. When the control device 23 determines that there is a possibility that the kicking motion has been performed as a result of making the primary determination, the control device 23 makes the secondary determination. Then, the control device 23 determines whether the kicking motion has been performed based on a result of the secondary determination.

In the example of FIG. 3, first, the control device 23 writes and stores the detection values obtained for a certain time (for example, one second) from the sensors of the upper sensor 10 and the lower sensor 12 in the storage 24 (Step S1).

The control device 23 refers to the detection values by the sensors of the upper sensor 10 and the lower sensor 12 from the storage 24 to make the primary determination (Step S2).

The control device 23 makes the primary determination on the detection values by the sensors of the upper sensor 10 and the lower sensor 12. Since contents of a process of the primary determination are the same, only the primary determination on the upper sensor 10 will be described in the following description of the primary determination. The description of the primary determination on the lower sensor 12 will be omitted.

When the predetermined condition is satisfied with respect to the detection values by the sensor of the upper sensor 10, the control device 23 determines that there is the possibility that the kicking motion has been performed in the primary determination.

The predetermined condition includes, for example, the following first condition to third condition.

The first condition is that the detection values by the upper sensor 10 shows a predetermined mode of indicating the approach and separation of the object with the lapse of time. Note that the predetermined mode will be described in detail below.

The second condition is that a time required from the approach to the separation is within a predetermined time in the predetermined mode of indicating the approach and separation of the object.

The third condition is that the sensor detection value when the object approaches closest to the upper sensor 10 in a process of the approach and separation of the object does not exceed a predetermined upper limit value (that is, does not approach too much).

When the conditions of both the first condition and the second condition are satisfied among these conditions, the motion determination device makes the primary determination of OK. When a more accurate determination is made, the motion determination device makes the primary determination of OK when all the conditions of the first condition, the second condition, and the third condition added are satisfied.

When it is determined that there is the possibility that the kicking motion has been performed in the primary determination, the control device 23 makes the secondary determination (Step S3).

When a ratio of the maximum value of the detection value by the upper sensor 10 and the maximum value of the detection value by the lower sensor 12 is within a predetermined range, the control device 23 determines that the kicking motion has been performed in the secondary determination.

The control device 23 determines that the predetermined kicking motion has been performed based on the result of the secondary determination (Step S4).

The control device 23 notifies the upper ECU that it is determined that the predetermined kicking motion has been performed (Step S5).

On the other hand, when it is determined that there is no possibility that the kicking motion has been performed in the primary determination, or when it is determined that the kicking motion is not performed in the secondary determination, the control device 23 determines that the predetermined kicking motion is not performed (Step S8).

In this case, returning to Step S1, the primary determination is made on the detection values obtained for a next certain time by the sensors of the upper sensor 10 and the lower sensor 12.

Further, as shown in the example of FIG. 4, the control device 23 may make the secondary determination by using a ratio of area values obtained by integrating the detection values by the respective sensors instead of the ratio of the maximum value of the detection value by the upper sensor 10 and the maximum value of the detection value by the lower sensor 12. The area values will be described in detail below.

In FIG. 4, in each of Steps S11 and S12, the same process as in Steps S1 and S2 in FIG. 3 is performed.

When it is determined that there is the possibility that the kicking motion has been performed in the primary determination, the control device 23 makes the secondary determination (Step S13).

The process in the secondary determination in FIG. 4 is as follows. The values (area values of the detection values in the predetermined time) obtained by integrating portions exceeding a predetermined threshold value of the detection values by the upper sensor 10 and the lower sensor 12 within a time period of showing the predetermined mode of indicating the approach and separation of the object are obtained. Then, it is determined whether the ratio of the area value of the detection value by the upper sensor 10 to the area value of the detection value by the lower sensor 12 is within a predetermined range.

In FIG. 4, in Steps S14, S15 and S18, the same process as in Steps S4, S5 and S8 in FIG. 3 is performed.

Hereinafter, contents of the primary determination and the secondary determination will be described in order.

<Primary Determination>

Here, the primary determination will be described with reference to FIG. 5. FIG. 5 is a diagram for explaining the primary determination. In FIG. 5, a horizontal axis represents the time. A vertical axis indicates the detection value by the upper sensor 10. In the example of FIG. 5, the detection value increases as the object approaches the position of the upper sensor 10 electrode. That is, in FIG. 5, a point Y1 indicates a closer approach than a point X1 does. A point Z indicates the closest approach. In addition, in FIG. 5, it is indicated that the object is more separated from the upper sensor 10 at a point X2 than at a point Y2.

The control device 23 determines, as the first condition for determining that there is the possibility that the kicking motion has been performed in the primary determination, whether the detection values indicate the predetermined mode of indicating the approach and separation of the object. In order to determine whether the detection values indicate the predetermined mode, for example, the control device 23 divides an elapsed time and a process of change in the detection value along with elapsed time into five stages. The five stages used by the control device 23 are, for example, stages indicated by (1) Normal, (2) Open, (3) In, (4) Close and (5) OK, which are described below a time axis as the horizontal axis in FIG. 5.

(1) The Normal stage is a normal state, and is a stage showing a state in which the object is not approaching the upper sensor 10.

(2) The Open stage is a stage showing a state in which the object approaches the upper sensor 10 from the Normal stage.

(3) The In stage is a stage showing a state in which the object approaches the upper sensor 10 more closely from the Open stage, approaches closest, and separates from the closest situation.

(4) The Close stage is a stage showing a state in which the object further separates from the In stage.

(5) The OK stage is a stage showing a state in which the object further separates from the upper sensor 10 than the Close stage and returns to the normal state in which the object is not approaching the upper sensor 10.

Further, the control device 23 sets a plurality of threshold values for the detection value by the upper sensor 10.

The threshold values set by the control device 23 are, for example, a START threshold value and a MIN threshold value described on the vertical axis in FIG. 5.

The START threshold value is a value indicating a boundary point (point X1 in FIG. 5) at which the detection value transitions from the Normal stage to the Open stage. In the Normal stage, the control device 23 transitions to the Open stage when the detection value becomes equal to or more than the START threshold value.

The MIN threshold value is a value indicating a boundary point (point Y1 in FIG. 5) at which the detection value transitions from the Open stage to the In stage. In the Open stage, the control device 23 transitions to the In stage when the detection value becomes equal to or more than the MIN threshold value.

The MIN threshold value is a value indicating a boundary point (point Y2 in FIG. 5) at which the detection value transitions from the In stage to the Close stage. In the In stage, the control device 23 transitions to the Close stage when the detection value becomes less than the MIN threshold value.

The START threshold value is a value indicating a boundary point (point X2 in FIG. 5) at which the detection value transitions from the Close stage to the OK stage. In the Close stage, the control device 23 transitions to the OK stage when the detection value becomes less than the START threshold value.

Further, the control device 23 determines, as the second condition for determining that there is the possibility that the kicking motion has been performed in the primary determination, whether a time period in which the detection value by the upper sensor 10 indicates the approach and separation of the object is within a predetermined determination time (indicated as "DETERMINATION PERIOD" in FIG. 5).

The control device 23 starts a timer, for example, when the detection value transitions to the Open stage in order to determine whether the time period indicating the approach and separation is within the predetermined determination time. Then, the control device 23 determines that there is no possibility that the kicking motion has been performed in the primary determination, when the detection value does not transition to the OK stage before the predetermined determination time elapses from start of the timer.

The control device 23 determines, as the third condition for determining that there is the possibility that the kicking motion has been performed in the primary determination, whether the maximum value of the detection value does not exceed a predetermined value.

The threshold value used by the control device 23 to determine whether the maximum value does not exceed the predetermined value is, for example, a MAX threshold value described on the vertical axis in FIG. 5.

When the maximum value (point Z in FIG. 5) of the detection value is equal to or greater than the MAX threshold value, the control device 23 determines that there is no possibility that the kicking motion has been performed in the primary determination.

Here, a flow of the process of the primary determination made by the control device 23 will be described.

First, as a premise, the control device 23 writes and stores in advance variables used for making the primary determination in the storage 24.

The variables used for making the primary determination are the threshold values of the START threshold value, the MIN threshold value, and the MAX threshold value, respectively a management flag StgFlg_0, StgFlg_1, and a determination time TLmt.

The management flags StgFlg_0 and StgFlg_1 are variables for managing the stages of the detection values by the upper sensor 10 and the lower sensor 12. For example, when this variable is 0 (zero), 1, 2, 3 and 4, the Normal stage, the Open stage, the In stage, the Close stage and the OK stage are respectively meant.

Further, suffixes "_0" and "_1" of the variables used by the control device 23 for the process of the primary determination respectively indicate the upper sensor 10 and the lower sensor 12. In the process of the primary determination, the same processes are performed on the upper sensor 10 and the lower sensor 12. Therefore, only the primary determination of the upper sensor 10 will be described in the following description. The description of the primary determination on the lower sensor 12 will be omitted.

The control device 23 obtains the detection value by the upper sensor 10 for a certain period (for example, one second). Then, the control device 23 stores the detection values, and times at which the detection values are detected in the storage 24.

The control device 23 compares the detection values with the START threshold value with respect to the detection values stored in the storage 24 in the order of detection.

When the detection value by the upper sensor 10 becomes equal to or more than the START threshold value, the control device 23 sets StgFlg_0 to 1 and transitions from the Normal stage to the Open stage.

When StgFlg_0 is 1 (Open stage) and the detection value by the upper sensor 10 becomes equal to or more than the MIN threshold value, the control device 23 sets StgFlg_0 to 2 and transitions from the Open stage to the In stage.

When StgFlg_0 is 2 (In stage) and the detection value by the upper sensor 10 becomes less than the MIN threshold value, the control device 23 sets StgFlg_0 to 3 and transitions to the Close stage.

When StgFlg_0 is 3 (Close stage) and the detection value by the upper sensor 10 becomes less than the START threshold value, the control device 23 sets StgFlg_0 to 4 and transitions to the OK stage.

Further, when the control device 23 sets StgFlg_0 to 1 (Open stage), it starts a timer from a time Ts when the detection value is detected. When the determination time TLmt has elapsed since the start of the timer, if the control device 23 has not transitioned to the OK stage, it determines that there is no possibility that the kicking motion has been performed in the primary determination. In the example of FIG. 5, the timer is started from an Open stage start time Ts. Then, when the determination time TLmt has elapsed since the start of the timer, if the control device 23 has not transitioned to the OK stage, it determines that there is no possibility that the kicking motion has been performed in the primary determination.

Furthermore, when StgFlg_0 is 2 (In stage) and the detection value by the upper sensor 10 becomes equal to or more than the MAX threshold value, the control device 23 determines that there is no possibility that the kicking motion has been performed in the primary determination.

If a transition of the stage indicates a pattern deviating from a mode assuming that the kicking motion has been performed in the process of the primary determination, for example, if the detection value falls below the START threshold again in a state of the Open stage, the control device 23 determines that there is no possibility that the kicking motion has been performed in the primary determination.

As described above, in the primary determination, the control device 23 obtains the detection values by the sensors for a predetermined period as a whole. The detection value is then compared with the START threshold value or the MIN threshold value. In this manner, division into the above five stages is performed.

If the process of change in the detection values by the both sensors along with the elapsed time transitions in the order of the Normal stage, the Open stage, the In stage, the Close stage, and the OK stage, and if a time from the transition to the Open stage to the transition to the OK stage is within the predetermined determination time, the control device 23 determines that there is the possibility that the kicking motion has been performed in the primary determination. In this case, when the detection value at a point where the object is closest to the sensor does not exceed the MAX threshold value in the In stage, the control device 23 may further determine that there is the possibility that the kicking motion has been performed in the primary determination.

<Secondary Determination>

Here, the secondary determination will be described with reference to FIGS. 6(a) and 6(b). FIGS. 6(a) and 6(b) are diagrams for explaining the secondary determination. FIG. 6(a) is a graph showing an example of change of the detection value (indicated as "UPPER SENSOR DETECTION VALUE" in FIG. 6(a)) by the upper sensor 10. FIG. 6(b) is a graph showing an example of change of the detection value (indicated as "LOWER SENSOR DETECTION VALUE" in FIG. 6(b)) by the lower sensor 12. In the graphs of FIGS. 6(a) and 6(b), the horizontal axis represents the time and the vertical axis represents the detection values.

FIG. 6(a) shows a state in which the object approaches, then separates from, the upper sensor 10 as time elapses as in FIG. 5. In the pattern of the approach and separation, the In stage is shown between a point Y1_0 and a point Y2_0. Further, a point Z_0 indicates that the object is closest to the upper sensor 10.

FIG. 6(b) shows a state in which the object approaches, then separates from, the lower sensor 12 as time elapses as in FIG. 5. In the pattern of the approach and separation, the In stage is shown between a point Y1_1 and a point Y2_1. Further, a point Z_1 indicates that the object is closest to the lower sensor 12.

When the control device 23 determines that there is the possibility that the kicking motion has been performed in the primary determination, it makes the secondary determination.

In order to make the secondary determination, the control device 23 obtains the maximum value Max_0 (indicated as "UPPER SENSOR Max VALUE" in FIG. 6(*a*)) of the detection value by the upper sensor 10 and the maximum value Max_1 (indicated as "LOWER SENSOR Max VALUE" in FIG. 6(*b*)) of the detection value by the lower sensor 12.

Then, when a ratio X (=Max_0/Max_1) of the maximum value Max_0 to the maximum value Max_1 is within a predetermined range, the control device 23 determines that the secondary determination is OK.

Here, the predetermined range of the ratio X is a predetermined range determined in advance. For example, when sensor performance of the upper sensor 10 is equal to the sensor performance of the lower sensor 12, the ratio X is $0.7 \leq X \leq 1.3$, $0.5 \leq X \leq 1.5$, or the like.

The range of the ratio X is determined by the performance, sensitivity, shape and the like of each sensor. For example, even when the upper sensor 10 and the lower sensor 12 are sensors having the same performance, the range of the ratio X may be different depending on a relationship of mounting positions of the sensors.

Even if it is said as the kicking motion unconditionally, in fact, various motions are performed by a person who performs the kicking motion.

For example, when the kicking motion is performed after considerably approaching the rear bumper, a value detected when an instep portion of the foot approaches the lower sensor 12 most closely is smaller than a value detected when a shank portion of the foot approaches the upper sensor 10 most closely. Therefore, the ratio X is greater than 1. On the other hand, when the kicking motion is performed when not approaching the rear bumper so much, the value detected when the instep portion of the foot approaches the lower sensor 12 most closely is greater than the value detected when the shank portion of the foot approaches the upper sensor 10 most closely. Therefore, the ratio X is smaller than 1.

In this way, when the ratio X is within a certain range, it is determined that the secondary determination is OK. This makes it possible to make a highly accurate kicking motion determination without making an erroneous determination depending on how to move the foot when the kicking motion is performed.

Further, the control device 23 may make the determination using the area values of the In stage instead of using the ratio between the maximum values of the respective detection values in the secondary determination.

An area value Sr_0 of the In stage of the upper sensor 10 is, for example, a portion indicated by hatching in FIG. 6(*a*). Further, an area value Sr_1 of the In stage of the lower sensor 12 is, for example, a portion indicated by hatching in FIG. 6(*b*).

When a ratio Y (=Sr_1/Sr_0) of the area value Sr_1 to the area value Sr_0 is within a predetermined range, for example, $0.5 \leq Y \leq 1.5$, the control device 23 determines that the secondary determination is OK.

Here, a method of obtaining the maximum value and the area value used in the secondary determination made by the control device 23 will be described.

First, the method of obtaining the maximum value will be described.

When StgFlg_0 is set to 2 (In stage), the control device 23 substitutes the detection value by the upper sensor 10 at that time into a variable Tmp_0.

While StgFlg_0 is 2 (In stage), the control device 23 compares the detection value by the upper sensor 10 with the variable Tmp_0, and when the detection value is equal to or more than the variable Tmp_0, the control device 23 substitutes the detection value into the variable Tmp_0.

The control device 23 sets a value of the variable Tmp_0 when StgFlg_0 has transitioned to 3 (Close stage) to the maximum value Max_0.

As in a case of the upper sensor 10, the maximum value Max_1 is also obtained for the lower sensor 12.

Next, the method of obtaining the area value will be described. When StgFlg_0 is set to 2 (In stage), the control device 23 substitutes a portion exceeding the MIN threshold value out of the detection value by the upper sensor 10 at that time into the variable Tmp_0. While StgFlg_0 is 2 (In stage), the control device 23 adds the portion exceeding the MIN threshold value out of the detection value by the upper sensor 10 to the variable Tmp_0. The control device 23 sets the value of the variable Tmp_0 when StgFlg_0 has transitioned to 3 (Close stage) to the area value Sr_0.

The control device 23 also obtains the area value Sr_1 for the lower sensor 12 as in the case of the upper sensor 10.

Further, in the secondary determination, the control device 23 may add to determination conditions whether a relation of time change of the detection values by the upper sensor 10 and the lower sensor 12 is in a predetermined relation.

For example, while the detection value by the upper sensor 10 is in the In stage, if the detection value by the lower sensor 12 is in the In stage, the control device 23 may determine that the secondary determination is OK As a specific process, the control device 23 stores in the storage 24 a start time Ts_1 and an end time Te_1 of the In stage of the detection value by the lower sensor 12 in addition to a start time Ts_0 and an end time Te_0 of the In stage of the detection value by the upper sensor 10. When the start time Ts_1 of the In stage of the lower sensor 12 is before the start time Ts_0 of the In stage of the upper sensor 10, or when the end time Te_1 of the In stage of the lower sensor 12 is after the end time Te_0 of the In stage of the upper sensor 10, the control device 23 determines that the secondary determination is NG.

In this manner, in the secondary determination, the control device 23 obtains the maximum values of the detection values respectively by the sensors of the upper sensor 10 and the lower sensor 12. When the ratio between the maximum values is within the predetermined range, the control device 23 determines that the secondary determination is OK.

Or, in the secondary determination, the control device 23 obtains the area values respectively obtained by integrating the portions exceeding the MIN threshold value out of the detection values by the sensors of the upper sensor 10 and the lower sensor 12. When the ratio of the area values is within the predetermined range, the control device 23 determines that the secondary determination is OK.

Further, in the secondary determination, when the maximum value of the detection value by the lower sensor 12 is detected while the detection value by the upper sensor 10 is in the In stage, the control device 23 may determine that the secondary determination is OK.

As described above, in the primary determination, the motion determination device according to the embodiment of the present invention determines that there is the possibility that the kicking motion has been performed when the pattern of approaching and separating of the object to and from the sensor is the predetermined pattern and the pattern is performed within the predetermined time. The motion determination device can also determine that there is the possibility that the kicking motion has been performed if the maximum value of the detection value from the sensor does not exceed the predetermined value in each pattern.

In the primary determination, when it is determined that there is the possibility that the kicking motion has been performed, the secondary determination is further made. At this time, when the ratio between the maximum values of the detection values respectively by the upper sensor 10 and the lower sensor 12 is within the predetermined range, it is determined that the secondary determination is OK.

In this way, the motion determination device of the embodiment according to the present invention distinguishes between the kicking motion and motions different from the kicking motion. In this way, the erroneous determination can be prevented.

Further, according to the motion determination device of the present embodiment, the motion determination can be performed using only two sensors of the upper sensor 10 and the lower sensor 12 without providing a large number of sensors. Therefore, it is possible to prevent an increase in the number of parts.

Further, the motion determination device of the present embodiment can make the motion determination regardless of whether the sensor detection region of the upper sensor 10 and the sensor detection region of the lower sensor 12 overlap each other. Therefore, it is not necessary to provide the shield for distinguishing the detection regions of the respective sensors.

Since the motion determination device according to the embodiment of the present invention makes the primary determination and the secondary determination, it is possible to prevent the erroneous determination that the kicking motion has been performed for the approach and separation of the object different from the kicking motion.

Here, generally in the motion judgment, even if the approach and separation of the object is just detected by using the threshold value with respect to the value detected from the electrode of the electrostatic capacitance sensor, it is difficult to determine whether it is caused due to the kicking motion. In addition, if it is determined that the kicking motion is performed when approaching beyond a certain distance using the threshold value, it may happen that it is not determined as the kicking motion because of the erroneous determination although the kicking motion is actually performed when kicking motion is performed without approaching so much.

In view of such circumstances, the inventors have intensively studied the motion determination device of the present embodiment. As a result, the motion determination device is configured to make the primary determination and the secondary determination so that the kicking motion performed by the user about to open or close the rear gate or the like of the vehicle can be determined correctly and easily.

Here, determination results of the kicking motion determination made by the motion determination device of the embodiment according to the present invention when the kicking motion and the motions different from the kicking motion are performed will be described with reference to FIGS. 7(a) to 7(e). FIGS. 7(a) to 7(e) show examples of the time change of the detection values by the sensors caused by the object approaching the sensor with the kicking motion and the motions different from the kicking motion.

FIG. 7(a) shows an example of the change in the detection value when the approach by the kicking motion is performed (indicated as "Kick" in FIG. 7(a)). FIG. 7(b) shows an example of the change in detection value when the approach by a person passing near is performed (indicated as "Walking" in FIG. 7(b)). FIG. 7(c) shows an example of the change in the detection value when the approach by a small animal passing near is performed (indicated as "Animal" in FIG. 7(c)). FIG. 7(d) shows an example of the change in the detection value when the approach by passing of water flow by car wash is performed (indicated as "Hose" in FIG. 7(d)). FIG. 7(e) shows an example of the change in the detection value when the approach by passing of raindrops by rainfall is performed (indicated as "Rain" in FIG. 7(e)).

In the kicking motion of FIG. 7(a), the detection values by the upper sensor 10 and the lower sensor 12 naturally indicate a mode of indicating the predetermined approach and separation (assumed by the kicking motion). Further, the maximum value of the detection values by the both sensors does not become a value exceeding the MAX threshold value. Further, the predetermined approach and separation are performed within the predetermined determination time. Therefore, it is determined that there is the possibility that the kicking motion has been performed in the primary determination.

In the kicking motion, the maximum values detected by the sensors of the upper sensor 10 and the lower sensor 12 have values comparable to each other. Therefore, the ratio between the maximum values is within the predetermined range. Therefore, the determination of OK is made also in the secondary determination.

Since the determination of OK is made in the secondary determination, the motion determination device of the embodiment according to the present invention determines that the predetermined kicking motion has been performed.

In an approaching motion by the person passing near the vehicle 1 in FIG. 7(b), since the upper sensor 10 detects the approach and separation of the person, the detection values may indicate the predetermined mode (assumed by the kicking motion) in some cases. Further, in this approaching motion, there may be a case where the approach beyond the predetermined distance is not performed, and the approach and separation are performed within the predetermined time. At this time, the lower sensor 12 also detects the approach and separation of the person at the same time. Therefore, there may be a case where it is determined that there is the possibility that the kicking motion has been performed in the primary determination.

However, if the person passes near the vehicle 1, the person does not approach the lower sensor 12 so much. Therefore, the maximum value of the detection value by the lower sensor 12 has a smaller value than the maximum value of the detection value by the upper sensor 10. Therefore, the ratio between the maximum values does not fall within the predetermined range in the secondary determination. As a result, it is determined as NG in the secondary determination.

Since it is determined that the secondary determination is NG, the motion determination device of the embodiment according to the present invention determines that the approaching motion by the person passing near the vehicle 1 is not the predetermined kicking motion.

In the approaching motion by the small animal such as a cat passing near the vehicle 1 in FIG. 7(c), since the lower sensor 12 detects the approach and separation of the small animal, the detection values may indicate the predetermined mode (assumed by the kicking motion) in some cases. Further, in this approaching motion, there may be a case where the approach beyond the predetermined distance is not performed, and the approach and separation are performed within the predetermined time. At this time, the upper sensor 10 also detects the approach and separation of the small animal at the same time. Therefore, there may also be a case where the detection values indicate the predetermined mode (assuming the kicking motion). Therefore, there may be the case where it is determined that there is the possibility that the kicking motion has been performed in the primary determination.

However, when the small animal passes near the vehicle 1, the small animal does not approach the upper sensor 10 so much. Therefore, the area value of the detection values by the upper sensor 10 has a smaller value than the area value of the detection values by the lower sensor 12. Therefore, the ratio between the maximum values does not fall within the predetermined range in the secondary determination. As a result, the determination of NG is made in the secondary determination.

Since it is determined that the secondary determination is NG, the motion determination device of the embodiment according to the present invention determines that the approaching motion by the small animal passing near the vehicle 1 is not the predetermined kicking motion.

In the approaching motion of the water flow by the car wash flowing down a side surface of the vehicle 1 in FIG. 7(d), the upper sensor 10 and the lower sensor 12 may detect the approach and separation of the water flow within the determination time (assumed by the kicking motion) in some cases.

However, if the water flow by the car wash flows down the side surface of the vehicle 1, the water flow approaches the sensor along the side surface of the vehicle 1, that is, until it is in contact with the sensor. Therefore, the maximum values of the detection values by the sensors become equal to or more than the predetermined MAX threshold value. As a result, it is determined that there is no possibility that the kicking motion has been performed in the primary determination.

Since it is determined that there is no possibility that the kicking motion has been performed in the primary determination, the secondary determination is not made. As a result, the motion determination device according to the embodiment of the present invention determines that the approaching motion of the water flow by the car wash flowing down the side surface of the vehicle 1 is not the predetermined kicking motion.

In the approaching motion of the raindrops by the rainfall falling on the vehicle 1 in FIG. 7(e), the upper sensor 10 and the lower sensor 12 may detect the approach and separation (assumed by the kicking motion) in some cases.

However, the raindrops by the rainfall continue to fall for longer than the predetermined determination time assumed by the kicking motion. Therefore, the time from the approach to the separation indicated by the detection values by the sensors exceeds the predetermined determination time. Therefore, it is determined that there is no possibility that the kicking motion has been performed in the primary determination.

It is determined that there is no possibility that the kicking motion has been performed in the primary determination. Therefore, the secondary determination is not made. As a result, the motion determination device according to the embodiment of the present invention determines that the approaching motion of the raindrops by the rainfall falling on the vehicle 1 is not the predetermined kicking motion.

As described above, the motion determination device according to the embodiment of the present invention can correctly determine that the kicking motion has been performed for the kicking motion intended and performed by the user 2 by making the primary determination and the secondary determination.

Further, when the person or the small animal merely passes near the vehicle 1, the erroneous determination that the kicking motion has been performed is not made.

Furthermore, the erroneous determination that the kicking motion has been performed is not made for the motion of the water flow by the car wash or of the raindrops by the rainfall.

For example, in the above embodiments, the primary determination made based on common threshold values (START threshold value, MIN threshold value, MAX threshold value) for the upper sensor 10 and the lower sensor 12 has been described. However, the primary determination may be made using individual threshold values (START threshold value, MIN threshold value, MAX threshold value) for each of the upper sensor 10 and the lower sensor 12. As a result, even if the sensor performance of the upper sensor 10 is different from that of the lower sensor 12, an appropriate primary determination can be made.

For the upper sensor 10 and the lower sensor 12, the primary determination performed based on a common determination time has been described. However, the primary determination may be made using individual determination times for each of the upper sensor 10 and the lower sensor 12. Thus, even when the upper sensor 10 and the lower sensor 12 make stage determinations using different threshold values, the appropriate primary determination can be made.

Further, in the above embodiments, for the area value of the In stage of the secondary determination used in Step S3, obtaining the area values by integrating differences between the detection values by the upper sensor 10 and the lower sensor 12 and the MIN threshold value has been described. However, the area values may be obtained by integrating the respective detection values. Thus, a process of calculating the differences can be omitted.

Further, in the above embodiments, it has been described that the condition that the maximum value of the lower sensor 12 is detected while the upper sensor 10 is in the In stage in the secondary determination may be set. However, the condition is not limited to this. For example, in the kicking motion, the foot of the user 2 first approaches the upper sensor 10, then approaches the lower sensor 12, further separates from the lower sensor 12, and then separates from the upper sensor 10. Therefore, a condition that the lower sensor 12 is the In stage while the upper sensor 10 is in the In stage may be set. Thus, the appropriate determination of the kicking motion can be made.

The embodiments of the present invention have been described above in detail with reference to the drawings. However, the specific structures are not limited to the embodiments. Designs and the like within the scope not departing from the gist of the present invention are also included in the technical scope of the present invention.

LIST OF REFERENCE NUMERALS

1: Vehicle, 2: user, 10: Upper sensor, 12: lower sensor, 20: Upper ECU, 22: control unit, 24: Storage, 30: Power supply device.

The invention claimed is:
1. A motion determination device, comprising:
two or more sensors respectively mounted on positions which are spaced apart from each other and have a relative vertical relationship in a vehicle, and detecting approach of an object; and a determination device for determining whether a predetermined kicking motion by a foot of a user has been performed based on detection values by the two or more sensors, wherein the determination device determines that the predetermined kicking motion has been performed when each of the detection values shows a pattern in which the detection value becomes equal to or more than a first threshold value and then equal to or more than a second threshold value greater than the first threshold value, and thereafter becomes less than the second threshold value and then less than the first threshold value, a time until each of the detection values becomes less than the first threshold value after it becomes equal to or more than the first threshold value is within a predetermined time, and a ratio of a maximum value among detection values by a first sensor among the two or more sensors and a maximum value among detection values by a second sensor different from the first sensor among the two or more sensors is within a predetermined range.

2. The motion determination device according to claim 1, wherein the determination device determines that the predetermined kicking motion has been performed when the maximum value of each of the detection values is a value not exceeding a third threshold value more than the second threshold value.

3. The motion determination device according to claim 1, wherein the determination device determines that the predetermined kicking motion has been performed when the detection value by the second sensor becomes equal to or more than the first threshold value and then becomes less than the first threshold value within a period in which the detection value by the first sensor becomes equal to or more than the first threshold value and then becomes less than the first threshold value.

4. A motion determination device, comprising:

two or more sensors respectively mounted on positions which are spaced apart from each other and have a relative vertical relationship in a vehicle, and detecting approach of an object; and a determination device for determining whether a predetermined kicking motion by a foot of a user has been performed based on detection values by the two or more sensors, wherein the determination device determines that the predetermined kicking motion has been performed when each of the detection values shows a pattern in which the detection value becomes equal to or more than a first threshold value and then equal to or more than a second threshold value greater than the first threshold value, and thereafter becomes less than the second threshold value and then less than the first threshold value, a time until each of the detection values becomes less than the first threshold value after it becomes equal to or more than the first threshold value is within a predetermined time, and a ratio of a first integrated value, which is an integrated value obtained by integrating portions exceeding the second threshold value out of the detection values by a first sensor out of the two or more sensors within a time period after the detection values by the first sensor becomes equal to or more than the second threshold value until it becomes less than the second threshold value, and a second integrated value, which is an integrated value obtained by integrating portions exceeding the second threshold value out of the detection values by a second sensor different from the first sensor among the two or more sensors within a time period after the detection values by the second sensor becomes equal to or more than the second threshold value until it becomes less than the second threshold value, is within a predetermined range.

5. The motion determination device according to claim 4, wherein the determination device determines that the predetermined kicking motion has been performed when the maximum value of each of the detection values is a value not exceeding a third threshold value more than the second threshold value.

6. The motion determination device according to claim 4, wherein the determination device determines that the predetermined kicking motion has been performed when the detection value by the second sensor becomes equal to or more than the first threshold value and then becomes less than the first threshold value within a period in which the detection value by the first sensor becomes equal to or more than the first threshold value and then becomes less than the first threshold value.

7. A motion determination method comprising:

a detection step in which two or more sensors respectively mounted on positions which are spaced apart from each other and have a relative vertical relationship in a vehicle detect approach of an object; and a determination step of determining whether a predetermined kicking motion by a foot of a user has been performed based on detection values by the two or more sensors, wherein in the determination step, it is determined that the predetermined kicking motion has been performed when each of the detection values shows a pattern in which the detection value becomes equal to or more than a first threshold value and then equal to or more than a second threshold value greater than the first threshold value, and thereafter becomes less than the second threshold value and then less than the first threshold value, a time until each of the detection values becomes less than the first threshold value after it becomes equal to or more than the first threshold value is within a predetermined time, and a ratio of a maximum value among the detection values by a first sensor among the two or more sensors and a maximum value among the detection values by a second sensor different from the first sensor among the two or more sensors is within a predetermined range.

* * * * *